United States Patent
Ito et al.

(10) Patent No.: US 10,240,032 B2
(45) Date of Patent: Mar. 26, 2019

(54) BINDER FOR POWDER METALLURGY, MIXED POWDER FOR POWDER METALLURGY, AND SINTERED BODY

(71) Applicant: Kobe Steel, Ltd., Kobe-shi (JP)

(72) Inventors: Yoshihiro Ito, Kobe (JP); Eiichiro Yoshikawa, Kobe (JP); Nobuaki Akagi, Takasago (JP); Mitsuhiro Sato, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 500 days.

(21) Appl. No.: 14/762,725

(22) PCT Filed: Feb. 17, 2014

(86) PCT No.: PCT/JP2014/053592
§ 371 (c)(1),
(2) Date: Jul. 22, 2015

(87) PCT Pub. No.: WO2014/136554
PCT Pub. Date: Sep. 12, 2014

(65) Prior Publication Data
US 2015/0361255 A1   Dec. 17, 2015

(30) Foreign Application Priority Data
Mar. 4, 2013   (JP) ................ 2013-041670

(51) Int. Cl.
*C08L 33/02* (2006.01)
*C22C 38/00* (2006.01)
(Continued)

(52) U.S. Cl.
CPC ........... *C08L 33/02* (2013.01); *B22F 1/00* (2013.01); *B22F 1/0059* (2013.01); *B22F 3/12* (2013.01);
(Continued)

(58) Field of Classification Search
CPC . B22F 1/0059; B22F 2001/0066; C08L 33/02
(Continued)

(56) References Cited

U.S. PATENT DOCUMENTS

| 4,834,800 A | 5/1989 | Semel |
| 5,132,338 A | 7/1992 | Hayami et al. |

(Continued)

FOREIGN PATENT DOCUMENTS

| CN | 102605178 A | 7/2012 |
| GB | 1 458 961 A | 12/1976 |

(Continued)

OTHER PUBLICATIONS

"Poly(ethylene-co-1-butene)" Sigma-Aldrich, 2016, Retrieved from the Internet: URL:http://www.sigmaaldrich.com/catalog/product/aldrich/434701?lang=en&region=NL, pp. 1-2.

(Continued)

*Primary Examiner* — Weiping Zhu
(74) *Attorney, Agent, or Firm* — Oblon, McClelland, Maier & Neustadt, L.L.P.

(57) ABSTRACT

The present invention provides a binder which has excellent effect on suppression of segregation or dust emission, while exhibiting excellent fluidity both at ordinary temperatures and at high temperatures. The present invention is a binder which is blended for use in a mixed powder for powder metallurgy, said mixed powder containing an iron-based powder and an auxiliary starting material powder. This binder is characterized by being composed of one or more polymers that are selected from among butene polymers having a melting point of from 50° C. to 85° C. (inclusive) and a heated melt fluidity at 190° C. of from 2.0 g/10 minutes to 3.6 g/10 minutes (inclusive) and methacrylic acid polymers having a weight average molecular weight of 1,000,000 or less.

9 Claims, 3 Drawing Sheets

(51) Int. Cl.
  *B22F 1/00* (2006.01)
  *B22F 3/12* (2006.01)
  *C08L 23/20* (2006.01)
  *C22C 33/02* (2006.01)

(52) U.S. Cl.
  CPC .............. *C08L 23/20* (2013.01); *C22C 38/00* (2013.01); *C22C 33/02* (2013.01)

(58) Field of Classification Search
  USPC .......................................................... 75/252
  See application file for complete search history.

(56) References Cited

U.S. PATENT DOCUMENTS

| | | | |
|---|---|---|---|
| 5,286,275 | A | 2/1994 | Murakami et al. |
| 5,380,179 | A * | 1/1995 | Nishimura ............ B22F 1/0059 106/285 |
| 5,976,215 | A | 11/1999 | Uenosono et al. |
| 5,989,304 | A | 11/1999 | Ozaki et al. |
| 6,139,600 | A | 10/2000 | Ozaki et al. |
| 6,605,251 | B1 | 8/2003 | Vidarsson |
| 2003/0219617 | A1 | 11/2003 | Ozaki et al. |
| 2004/0038067 | A1 | 2/2004 | Ozaki et al. |
| 2004/0168547 | A1 | 9/2004 | Fujisawa et al. |

FOREIGN PATENT DOCUMENTS

| | | |
|---|---|---|
| JP | 63-103001 A | 5/1988 |
| JP | 2-217403 A | 8/1990 |
| JP | 5-86403 A | 4/1993 |
| JP | 5-148505 A | 6/1993 |
| JP | 5-319903 A | 12/1993 |
| JP | 9-104901 A | 4/1997 |
| JP | 2000-160206 A | 6/2000 |
| JP | 2003-105405 A | 4/2003 |
| JP | 2004-232079 A | 8/2004 |
| JP | 2004-256899 A | 9/2004 |
| JP | 2004-360008 A | 12/2004 |
| JP | 2008-285762 A | 11/2008 |
| JP | 2013-43789 A | 3/2013 |
| JP | 2013-112824 A | 6/2013 |
| KR | 2003-0091710 A | 12/2003 |

OTHER PUBLICATIONS

International Search Report and Written Opinion of the International Searching Authority dated Apr. 22, 2014 in PCT/JP14/053592 Filed Feb. 17, 2014.
Extended European Search Report dated Sep. 1, 2016 in Patent Application No. 14760890.5.
"Poly(ethylene-co-l-butene)," Sigma-Aldrich, Jan. 16, 2008, XP002760841, Retrieved from the Internet: URL:http://www.sigmaaldrich.com/catalog/product/aldrich/434728?lang=en&region=NL, 2 pages

* cited by examiner

BINDER FOR POWDER METALLURGY, MIXED POWDER FOR POWDER METALLURGY, AND SINTERED BODY

TECHNICAL FIELD

The present invention relates to a binder for powder metallurgy, which is blended for use in a mixed powder of a principal material powder and an auxiliary material powder, and a mixed powder for powder metallurgy, and a sintered body.

BACKGROUND ART

In a powder metallurgy process for manufacturing a product such as a sintered body using a principal material powder such as an iron-based powder, the principal material powder is mixed with an auxiliary material powder such as a graphite powder in order to improve physical properties, including a strength property and a processing property, of the sintered body, and the mixed powder is formed into a green compact by pressing. The green compact is sintered at a temperature equal to or lower than the melting point of the principal material powder to produce the sintered body.

It is generally pointed out that problems exist in a method of manufacturing such a sintered body. For example, it is known that when the formed green compact is extracted from a die, a friction coefficient between the green compact and a die surface may be increased, which causes die galling, i.e., scratches on the surface of the die, or damage to the die. A lubricant (for example, as in PTL 1) or the like therefore may be mixedly added into a mixed powder including a principal material powder and an auxiliary material powder in order to improve lubricating ability.

For example, the graphite, which is generally used as the auxiliary material powder, has a lower specific gravity and a smaller grain size than the iron-based powder as the principal material powder. It is therefore generally pointed out that if the graphite is simply mixed with the iron-based powder, they are greatly separated from each other and segregation of graphite occurs, which disadvantageously prevents uniform mixing. If the carbon content in a green compact varies due to the graphite segregation, carbon concentration in a sintered body also varies, and thus the sintered body has unstable mechanical properties. Consequently, it is difficult to produce stable components.

Furthermore, use of graphite causes scattering of the graphite and in turn causes dust emission in a mixing or pressing step. This disadvantageously lowers the graphite content in the mixed powder, and degrades working environment due to the graphite dust emission. Such segregation or dust emission occurs not only for the graphite but also for any of other powders to be mixed with the principal material powder. Hence, it is required to prevent such segregation or dust emission.

Adding a binder to the mixed powder, the binder acting as a bond, is therefore suggested as a technique for preventing the segregation or dust emission. For example, a rubber binder such as styrene-butadiene rubber (SBR) is provided as the binder (for example, PTL 2).

However, the rubber binder is highly adhesive, and thus causes the mixed powder to be less fluid. If the mixed powder is less fluid, the following problems occur. For example, in a pressing step, when the mixed powder is discharged from a storage hopper and transferred into a forming die, or when the mixed powder is filled in the forming die, the mixed powder is not smoothly discharged due to bridging or the like above a discharge port of the storage hopper. Moreover, a hose from the storage hopper to a shoe box is blocked. Furthermore, if the mixed powder is less fluid, the mixed powder is less likely to be filled in the entire inside, particularly a narrow space portion, of the forming die, making it difficult to produce a homogenous green compact.

To solve such problems, PTLs 3 to 10 each disclose a resin binder that prevents the segregation or dust emission and furthermore improves fluidity of the mixed powder, and an auxiliary additive for the resin binder.

CITATION LIST

Patent Literature

PTL 1: Japanese Unexamined Patent Application Publication No. Hei5(1993)-148505.
PTL 2: Japanese Unexamined Patent Application Publication No. Hei5(1993)-86403.
PTL 3: Japanese Unexamined Patent Application Publication No. Hei9(1997)-104901.
PTL 4: Japanese Unexamined Patent Application Publication No. 2003-105405.
PTL 5: Japanese Unexamined Patent Application Publication No. 2004-256899.
PTL 6: Japanese Unexamined Patent Application Publication No. 2004-360008.
PTL 7: Japanese Unexamined Patent Application Publication No. 2008-285762.
PTL 8: Japanese Unexamined Patent Application Publication No. Hei2(1990)-217403.
PTL 9: Japanese Unexamined Patent Application Publication No. Sho63(1988)-103001.
PTL 10: Japanese Unexamined Patent Application Publication No. 2013-112824.

SUMMARY OF INVENTION

Technical Problem

Adding any of the binders increases adhesion between the primal material powder and the auxiliary material powder. This prevents the segregation or dust emission, and improves fluidity of the mixed powder. However, the fluidity improvement effect of the mixed powder is not sufficient, and further improvement is demanded. For example, while the mixed powder is transferred, filled, or pressed, temperature of the mixed powder may be raised to a high temperature of 50° C. or higher due to frictional heat between the mixed powder particles or between the mixed powder and the inner wall of an apparatus. In such a case, a mixed powder containing a resin binder is less fluid at a high temperature while being fluid at an ordinary temperature. On the other hand, a mixed powder containing a resin binder that is fluid at a high temperature does not exhibit a sufficient prevention effect for the segregation or dust emission.

Hence, the segregation or dust emission, unsmooth discharge, blocking, or the like still occurs in the mixing or pressing step. It is therefore difficult to produce a homogenous, high-density sintered body.

Furthermore, the mixed powder is added to the mixed powder by spraying while being dissolved in an organic solvent. However, if such a binder solution is highly viscous, the mixed powder cannot be uniformly sprayed, leading to a variation in graphite adhesion amount in the mixed powder.

An object of the invention, which has been made in light of the above-described circumstances, is to provide a binder that exhibits a good suppression effect for segregation or dust emission, and exhibits a good fluidity even if it is heated at a high temperature of 50 to 70° C., for example. Another object of the invention is to provide a mixed powder for powder metallurgy, which allows a high-density sintered body to be produced with good forming workability, and provide a uniform, high-density sintered body.

Solution to Problem

A binder that is blended for use in a mixed powder for powder metallurgy, the mixed powder containing an iron-based powder and an auxiliary material powder. The binder is composed of one or more polymers that are selected from among butene polymers each having a melting point of 50 to 85° C. and a melt fluidity at 190° C. of 2.0 to 3.6 g/10 min, and methacrylic acid polymers each having a weight-average molecular weight of 1,000,000 or less.

The binder preferably contains one of the butene polymers and one of the methacrylic acid polymers together.

In the invention, the content of the methacrylic acid polymer in the binder is preferably at least 5 mass %.

In the invention, the butene polymer is preferably a copolymer of butene and lower alkylene, and more preferably a butene-propylene copolymer or a butene-ethylene copolymer.

The invention further includes a mixed powder for powder metallurgy, which contains an iron-based powder, an auxiliary material powder, and the binder of the invention. The content of the binder in the mixed powder for powder metallurgy of the invention is preferably 0.01 to 0.5 mass % relative to a total of 100 mass % of the iron-based powder and the auxiliary material powder. In the mixed powder, at least some of the iron-based powder and at least some of the auxiliary material powder are each preferably covered with the binder.

The invention further includes a sintered body produced by pressing and sintering the mixed powder for powder metallurgy.

Advantageous Effects of Invention

The binder of the invention is composed of one or more polymers selected from among the butene polymers each having the specified melting point and the specified melt fluidity and the methacrylic acid polymers each having the weight-average molecular weight of 1,000,000 or less. Hence, blending the binder to the mixed powder containing the iron-based powder and the auxiliary material powder effectively prevents segregation or scattering of the auxiliary material powder, and has a good effect on fluidity, particularly fluidity at 50 to 70° C., of the mixed powder.

Consequently, the mixed powder for powder metallurgy containing the binder of the invention is good in forming workability, and enables a homogenous, high-density sintered body to be provided.

DESCRIPTION OF EMBODIMENTS

Figure 1:
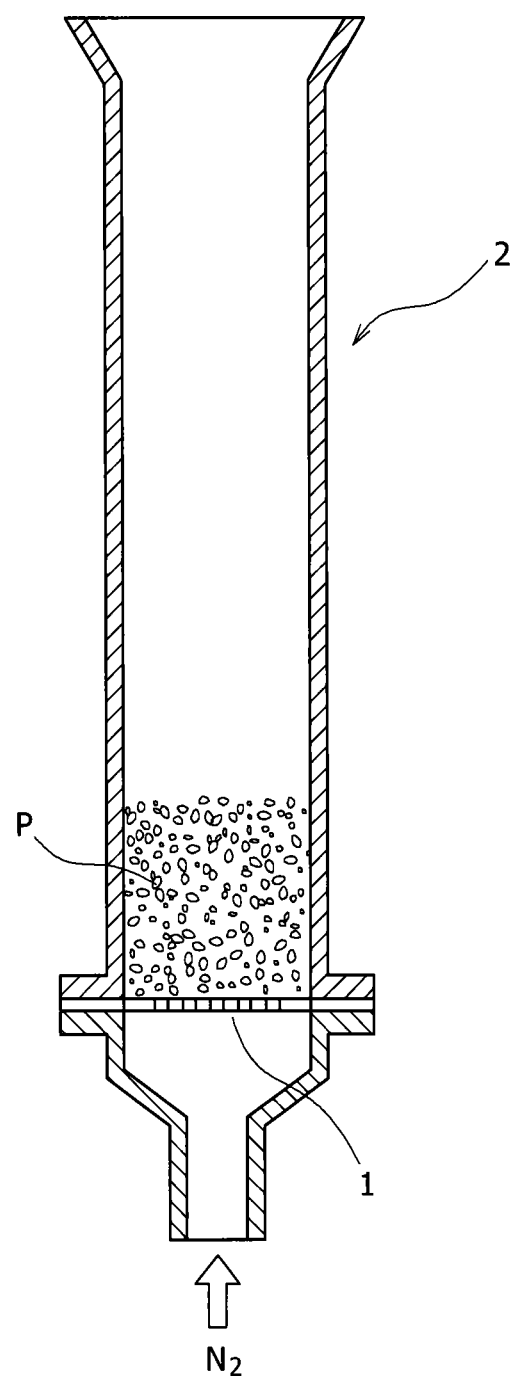
FIG. 1 is a sectional diagram of an instrument for measuring graphite scattering rate used in an example.

The inventors have found that the resin binder preferably includes the butene polymer, of which the melting point and the melt fluidity at 190° C. are each within a specified range, and the methacrylic acid polymer having a weight-average molecular weight within a specified range, and a binder including at least one of such polymers exhibits a good effect on fluidity not only at an ordinary temperature but also at a high temperature, and exhibits a good prevention effect for segregation or dust emission, and have finally completed the invention.

In the invention, "good in fluidity" means high fluidity not only at an ordinary temperature of 25° C. but also at a high temperature of 50 to 70° C. Specifically, under a measurement condition described in an example mentioned later, (1) the binder flows at 25° C. and at high temperatures of 50° C. and 70° C., where a flow rate at 25° C. is preferably 25 s/50 g or less, and a flow rate at each of 50° C. and 70° C. is preferably 30 s/50 g or less, more preferably 25 s/50 g or less. (2) The critical outflow diameter is small, preferably 25 mm or less, and more preferably 20 mm or less. (3) The die filling characteristics are good, preferably 30 g or more, more preferably 35 g or more.

In the invention, "good in prevention of segregation or dust emission" means that graphite scattering rate is 30% or less, preferably 10% or less under the measurement condition described in the example mentioned later. Low graphite scattering rate means high adhesion of graphite as the auxiliary material powder onto the mixed powder during production of the sintered body, i.e., means suppression of dust emission. For the segregation characteristics, a variation in graphite adhesion amount in the mixed powder is preferably 20% or more and less than 30%, more preferably 10% or more and less than 20%, and further preferably less than 10% under the measurement condition described in the example mentioned later.

The invention is now explained in detail with the circumstances of the invention.

Through investigations on fluidity of the mixed powder for powder metallurgy, the inventors have believed that while the fluidity is affected by particle size or a particle shape of a principal material powder to be used, and a type, adding amount, particle size, or a particle shape of an auxiliary material powder to be used, the fluidity at a high temperature of 50 to 70° C. is most greatly affected by the binder.

The inventors therefore have made investigations on existing rubber binders and the resin binders as described in the conventional art, and have got the following findings.

A mixed powder containing a rubber binder such as a styrene-butadiene rubber binder is fluid at 25° C., but is less fluid at a high temperature of 50° C. or higher as shown in Nos. 9 and 10 in Table 1 described later. The reason why fluidity lowers at the high temperature is probably because adhesion increases due to softening and/or melting of the rubber binder.

The inventors have also made investigations on fluidity, segregation characteristics, and dust emission characteristics of a mixed powder containing the existing resin binder, and have found that fluidity at a high temperature has a tendency opposite to that of the segregation characteristics or the dust emission characteristics, i.e., have found no binder satisfactorily having both the properties. Specifically, for the mixed powder containing the existing resin binder, a mixed powder exhibiting a good fluidity at a high temperature is less adhesive and exhibits a low prevention effect for segregation or dust emission as shown in No. 1 in Table 1 described later, for example. On the other hand, a mixed powder exhibiting a high prevention effect for segregation or dust emission is more adhesive and less fluid at a high temperature as shown in No. 2 in Table 1 described later, for example.

The inventors therefore have made investigations on resins that each exhibit both the fluidity improvement effect and the prevention effect for segregation or dust emission, and have found that a butene polymer and a methacrylic acid polymer are each preferred as a binder exhibiting such effects. However, some of butene polymers are bad in fluidity at a high temperature as shown in Nos. 7 and 8 in Table 1 described later. The inventors therefore have made further investigations on a condition allowing such excellent effects to be exhibited, and have finally found that a melting point and a melt fluidity at 190° C. of the butene polymer affect fluidity at a high temperature and segregation or dust emission. For the methacrylic acid polymer, the inventors also have found that the weight-average molecular weight of the polymer affects fluidity at a high temperature and segregation or dust emission. Furthermore, the inventors have found that a methacrylic acid polymer having a weight-average molecular weight of 1,000,000 or less, and a two-component resin including the butene polymer and the methacrylic acid polymer having a weight-average molecular weight of 1,000,000 or less each have a favorable influence on fluidity at a high temperature and suppression of segregation or dust emission.

In detail, it has been found that a butene polymer having a high melting point is less adhesive and thus highly fluid at a high temperature, but is low in adhesion between the principal material powder and the auxiliary material powder, leading to easy occurrence of segregation or dust emission. On the other hand, it has been found that a butene polymer having a low melting point is effective in suppressing segregation or dust emission. However, if the butene polymer has an excessively high melt fluidity as shown in No. 8 in Table 1 described later, or if the butene polymer has an excessively low melt fluidity as shown in No. 7 in Table 1 described later, the butene polymer is insufficient in fluidity at a high temperature. Through investigations in consideration of such tendencies, the inventors have found that the melting point and the melt fluidity of the butene polymer are each adjusted into a specified range, thereby the butene polymer exhibits a good fluidity even at a high temperature, and exhibits a good prevention effect for segregation or dust emission.

PTL 7 discloses a lubricant including a polyolefin resin having a weight-average molecular weight of 500 to 10,000. Although the butene polymer of the invention is also one of polyolefin resins, the resin in PTL 7 is different from the resin of the invention in the following points.

First, the application purpose is a lubricant in PTL 7, while that is a binder in the invention. Specifically, the lubricant is a lubricity imparting agent, which is used to reduce pulling pressure when a compact is extracted from a die after the mixed powder for powder metallurgy is die-formed in order to prevent cracks in a product or damage to the die. On the other hand, the binder is an adhesive imparting agent that is mainly intended to be used to increase adhesion between the principal material powder and the auxiliary material powder and reduce dusting or segregation. Such two agents are originally required to have different characteristics.

PTL 7 describes in its paragraph 0037 that the lubricant is importantly maintained at a temperature equal to or lower than the temperature, above which the lubricant is softened or melted, until a die is filled with the mixed powder, in light of handling during filling or uniformity of density of a compact. In other words, the lubricant in PTL 7 has a high melting point so as not to be softened or melted during transfer before the mixed powder is filled in the die. For example, a polyethylene wax having a melting point peak of 125 to 126° C. is used as shown in Table 1 in an Example in PTL 7. In contrast, the binder of the invention has a melting point of 50 to 85° C. Hence, when temperature of the binder is close to the melting point of the binder while the mixed powder is transferred or filled into the forming die, the binder is qualitatively softened or melted. Thus, the two are different in the melting point of the resin.

In this regard, PTL 7 discloses only polyethylene wax as the resin being the lubricant in the Example, and discloses no butene polymer as the subject of the invention. The polyethylene wax used in the Example of PTL 7 has a melting point of 125 to 129° C. as shown in Tables 1 and 4 in PTL 7, i.e., higher than the melting point of 50 to 85° C. specified in the invention. As shown in No. 2 in Table 1 in the example of the invention, when polyethylene having a high melting point of 120° C. is used as the binder to simulate PTL 7, the binder is not fluid at 50° C. or higher. Thus, the binder of the invention is also qualitatively different in effects from the binder of PTL 7. Consequently, the lubricant of PTL 7 is different from the binder of the invention.

A resin is used in different manners between the binder and the lubricant. Specifically, when a resin is used as the lubricant, a lubricant resin is separately added and mixed into an iron-based powder to produce a mixed powder in which the two exist in a mixed manner. In contrast, for the binder according to the invention, at least part of the mixed powder containing the iron-based powder and the auxiliary material powder is covered with the binder. Specifically, when a resin is used as the binder, the mixed powder is mixedly added into a solution containing the binder dissolved in an organic solvent, and then the organic solvent is dried to produce a mixed powder for powder metallurgy, the mixed powder being covered with the binder.

The inventors have further found that materials, which are suitable for the binder but exclude the butene polymers, include methacrylic acid polymers each having a weight-average molecular weight of 1,000,000 or less, and two-component binders containing one of the methacrylic acid polymers having a weight-average molecular weight of 1,000,000 or less together with one of the butene polymers, the materials exhibiting a good fluidity even at a high temperature while exhibiting a good prevention effect for segregation or dust emission. Among methacrylic acid polymers, the methacrylic acid polymer having a weight-average molecular weight of 1,000,000 or less is less viscous in a state of organic solvent-dissolved polymer than the butene polymer. Hence, such a methacrylic acid polymer is effective in reducing a variation in graphite adhesion amount in the mixed powder, and exhibits a high suppression effect for segregation or dust emission.

The configuration of the binder according to the invention is now described.

[Butene Polymer Having Melting Point of 50 to 85° C. and Melt Fluidity at 190° C. of 2.0 to 3.6 g/10 Min]

A first binder of the invention is composed of a butene polymer having a melting point of 50 to 85° C. and a melt fluidity at 190° C. of 2.0 to 3.6 g/10 min. The butene polymer of the invention includes a butene copolymer. The butene polymer includes a butene polymer composed of only butene, and a copolymer of butene and another alkene that is preferably a lower alkene. The lower alkene preferably has two or three carbons, and more preferably has three carbons.

Specifically, the butene polymer preferably includes 1-butene homopolymer and a copolymer of butene and ethylene or propylene, more preferably a copolymer of butene and propylene. The butene may be 1-butene, isobutene, or 2-butene.

Furthermore, the butene polymer according to the invention may have a structure having an appropriate one of other monomers or polymers. For example, a structure including vinyl acetate contributes to lowering of a melting point of the butene-ethylene copolymer.

(1) Melting Point of Butene Polymer: 50 to 85° C.

The melting point of the butene polymer affects fluidity of the binder at a binder temperature of from room temperature 25° C. to a high temperature about 70° C. Specifically, when the butene polymer according to the invention has a melting point of 50° C. or higher, even if temperature of the mixed powder is raised close to the melting point due to frictional heat between the mixed powder particles or between the mixed powder and the inner wall of an apparatus, adhesion of the butene polymer is not excessively increased so that fluidity is not degraded, and consequently good fluidity is exhibited. The butene polymer has a melting point of 50° C. or higher, preferably 60° C. or higher, and more preferably 70° C. or higher depending on types of the polymer. On the other hand, if the butene polymer has an excessively high melting point, adhesion between the principal material powder and the auxiliary material powder is weak, and thus the graphite scattering rate is increased. Consequently, segregation or dust emission may not be sufficiently prevented. Hence, the butene polymer has a melting point of 85° C. or lower, preferably 70° C. or lower, and more preferably 60° C. or lower. For example, the melting point is preferably within each of ranges used in the example, specifically a range from 77 to 85° C. for the butene-propylene copolymer and a range from 50 to 55° C. for the butene-ethylene copolymer.

(2) Melt Fluidity at 190° C. of Butene Polymer: 2.0 to 3.6 g/10 Min

The melt fluidity of the butene polymer affects fluidity of the butene polymer. In general, the higher the melt fluidity, the lower the viscosity. Hence, the inventors have speculated that when the butene polymer is used as a binder, fluidity of the butene polymer is also improved with an increase in melt fluidity. However, through experiments, it has been found that the melt fluidity is not proportionate to the fluidity, and when the melt fluidity is excessively low or high, the fluidity of the mixed powder may be rather lowered at a high temperature of 50° C. or higher, and the melt fluidity has an optimum value in relation to the fluidity. Hence, in light of ensuring the fluidity, the invention specifies the melt fluidity of the butene polymer to be 2.0 g/10 min or more, preferably 2.5 g/10 min or more, and more preferably 3.0 g/10 min or more and 3.6 g/10 min or less.

In the invention, the melting point and the melt fluidity of the butene polymer are each controlled to be within a specific range, thereby good fluidity is ensured from room temperature to a high temperature, and a prevention effect for segregation or dusting is provided.

In the invention, the butene polymer should satisfy only the above-described melting point and melt fluidity, and other properties such as weight-average molecular weight are not specifically limited. Hence, the form of the copolymer such as monomer sequence is not specifically limited, and the copolymer may be any one of random copolymer, alternating copolymer, random copolymer, block copolymer, and graft copolymer. In addition, the structure of the copolymer may be a straight chain structure or a branching structure.

The butene polymer according to the invention particularly preferably includes a butene-propylene copolymer represented by chemical formula (1), which has a melting point of preferably 77 to 85° C., and a melt fluidity of preferably 2.5 to 3.5 g/10 min, more preferably 2.8 to 3.3 g/10 min, and further preferably 3.0 g/10 min or less, for example. Alternatively, the butene polymer includes a butene-ethylene copolymer represented by chemical formula (2), which has a melting point of preferably 50 to 65° C. and more preferably 50 to 55° C., and a melt fluidity of preferably 3.4 to 3.6 g/10 min and more preferably 3.6 g/10 min or less, for example. The butene polymer of the invention most preferably includes the butene-propylene copolymer.

Chemical formula 1

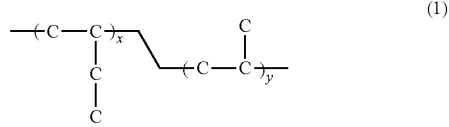

(where x and y are each an arbitrary integer (the melting point and the melt fluidity of the copolymer each satisfy the above-described values).)

Chemical formula 2

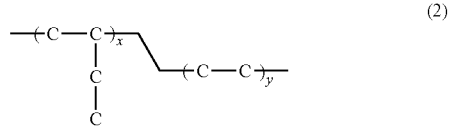

(where x and y are each an arbitrary integer (the melting point and the melt fluidity of the copolymer each satisfy the above-described values).)

The butene polymer according to the invention, which satisfies the above-described requirements, can be manufactured through polymerization based on any of known manufacturing processes. The butene polymer according to the invention may be commercially available as long as the melting point and the melt fluidity are satisfied.

[Methacrylic Acid Polymer Having Weight-Average Molecular Weight of 1,000,000 or Less]

A second binder of the invention is composed of a methacrylic acid polymer having a weight-average molecular weight of 1,000,000 or less. Examples of the methacrylic acid polymer include methyl methacrylate, ethyl methacrylate, butyl methacrylate, cyclohexyl methacrylate, ethylhexyl methacrylate, lauryl methacrylate, methyl acrylate, and ethyl acrylate, which may be used singly or in combination. Since the structural formula having a near straight chain form is more effective in exhibiting the effects of the invention, methyl methacrylate, ethyl methacrylate, butyl methacrylate, methyl acrylate, and ethyl acrylate are preferred, and methyl methacrylate, ethyl methacrylate, and butyl methacrylate are more preferred.

When the weight-average molecular weight of the methacrylic acid polymer of the invention is lowered, the methacrylic acid polymer is dissolved in an organic solvent during production while being appropriately adjusted in viscosity, and an increasing effect for adhesion between the iron powder and the graphite is exhibited. This suppresses a variation in graphite adhesion amount in the mixed powder, leading to a better segregation suppression effect than the butene polymer. In addition, high fluidity is exhibited at a high temperature of 50 to 70° C. To achieve such effects, the methacrylic acid polymer has a weight-average molecular weight of 1,000,000 or less, preferably 350,000 or less. Although the lower limit of the weight-average molecular weight is not specifically limited in light of improving the fluidity at a high temperature, excessively low weight-average molecular weight may lower the viscosity; hence, the lower limit is preferably 150,000 or more.

The methacrylic acid polymer according to the invention, which satisfies the above-described requirements, can be manufactured through polymerization based on any of known manufacturing methods. The methacrylic acid polymer according to the invention may be commercially available as long as the weight-average molecular weight is satisfied.

[Two-Component of Butene Polymer Having Melting Point of 50 to 85° C. and Melt Fluidity at 190° C. of 2.0 to 3.6 g/10 Min and Methacrylic Acid Polymer Having Weight-Average Molecular Weight of 1,000,000 or Less]

A third binder of the invention includes both the butene polymer as the first binder and the methacrylic acid polymer as the second binder. Combined use of the butene polymer and the methacrylic acid polymer allows the good segregation suppression effect of the methacrylic acid polymer to be exhibited while allowing the good fluidity at a high temperature of 50 to 70° C. to be exhibited. To achieve such an effect, the methacrylic acid polymer having a weight-average molecular weight of 1,000,000 or less described as the second binder is contained in an amount of preferably 5 mass % or more and more preferably 10 mass % or more in the binder, i.e., in a total of 100 mass % of the butene polymer and the methacrylic acid polymer.

The binder of the invention should contain the butene polymer, the methacrylic acid polymer, or both the butene polymer and the methacrylic acid polymer, and may further contain an additive such as an extreme-pressure agent and an oil-based lubricant, or a slight amount of inevitable impurities that is contaminable during a manufacturing process. The binder of the invention may also be configured of the butene polymer, the methacrylic acid polymer, or a combination of the butene polymer and the methacrylic acid polymer, and the inevitable impurities.

The mixed powder for powder metallurgy of the invention is now described. The mixed powder for powder metallurgy of the invention contains an iron-based powder, an appropriate auxiliary material powder, and the binder of the invention.

The iron-based powder is a material powder mainly composed of iron, and is a main material of the mixed powder. The iron-based powder may be a pure iron powder or an iron alloy powder. The iron alloy powder may be a partial alloy powder in which an alloy powder of copper, nickel, chromium, or molybdenum diffusedly adheres onto surfaces of the iron-based powder particles, or may be a pre-alloy powder produced from molten iron or molten steel containing alloy components. The iron-based powder is usually manufactured through atomization treatment of molten iron or molten steel. The iron-based powder may be a reduced iron powder manufactured through reduction of an iron ore or a mill scale.

Average particle size of the iron-based powder may be any size of the powder typically used as the principal material powder for powder metallurgy. For example, the average size is 40 to 120 μm, preferably 50 to 100 μm, more preferably 60 to 80 μm. To obtain the average size of the metal powder, particle size distribution is measured in accordance with "Sieve Analysis Test Method of Metal Powder" described in JAPAN POWDER METALLURGY ASSOCIATION Standard JPMA P 02-1992, and particle size at a cumulative minus sieve weights of 50% is calculated as the average size.

The auxiliary material powder can be appropriately selected depending on desired physical properties, and can be appropriately determined depending on properties required for final products within the scope without hindering the functions of the invention.

Examples of the auxiliary material powder include powders of alloy elements such as nickel, chromium, and molybdenum, and powders of inorganic components such as phosphor, sulfur, graphite, manganese sulfide, talk, and calcium fluoride as described later. Such powders may be contained singly or in combination.

The auxiliary material powder is preferably used in a total amount of preferably 10 mass % or less, more preferably 5 mass % or less, relative to 100 mass % of the principal material powder. This is because more than 10 mass % of the auxiliary material powder may lead to an adverse effect such as a reduction in strength of a sintered body due to lowering of the density of the sintered body. On the other hand, the lower limit is not specifically limited, and the added amount of the auxiliary material powder should be determined such that a predetermined addition effect is provided.

For example, each auxiliary material powder is preferably contained within the following range.

Graphite powder: 0.1 to 3 mass %, preferably 0.2 to 1 mass %.

Copper powder: 0.1 to 10 mass %, preferably 1 to 4 mass %.

Nickel powder: 0.1 to 10 mass %, preferably 0.5 to 4 mass %.

Chromium powder: 0.1 to 8 mass %, preferably 0.2 to 5 mass %.

Molybdenum powder: 0.1 to 5 mass %, preferably 0.2 to 3 mass %.

Phosphor: 0.01 to 3 mass %, preferably 0.05 to 1 mass %.
Sulfur: 0.01 to 2 mass %, preferably 0.03 to 1 mass %.
Manganese sulfide: 0.05 to 3 mass %, preferably 0.1 to 1 mass %.

Talk: 0.05 to 3 mass %, preferably 0.1 to 1 mass %.
Calcium fluoride: 0.05 to 3 mass %, preferably 0.1 to 1 mass %.

The content of each of the first to third binders is not specifically limited, but is preferably 0.01 mass % or more, and more preferably 0.03 mass % or more relative to a total of 100 mass % of the iron-based powder and the auxiliary material powder in light of preventing segregation or scattering of the auxiliary material powder and ensuring good fluidity. On the other hand, a high content of the binder may prevent production of a high-density sintered body; hence, the content is preferably 0.5 mass % or less, and more preferably 0.2 mass % or less.

In the invention, a known additive such as a lubricant can be used as necessary. Any of known lubricants can be used without limitation as long as the lubricant is usually used for powder metallurgy. Examples of such lubricants include metallic soap, lithium stearate, fatty acid amide, hydrocarbon wax, and cross-linked (meth) acrylic acid alkyl ester resin. Such lubricants may be used singly or in combination.

In the invention, the content of the additive to be used can be appropriately set within a normally used range. For example, the lubricant is preferably contained within a range of 0.01 to 1.5 mass % relative to a total of 100 mass % of the iron-based powder and the auxiliary material powder. For the content of the lubricant of less than 0.01 mass %, the function of the added lubricant may not be sufficiently exhibited. For the content of the lubricant of more than 1.5 mass %, compressibility or density of the green compact may be reduced. The content of the lubricant is more preferably 0.1 to 1.2 mass %, and further preferably 0.2 to 1.0 mass %.

A method of manufacturing each of the mixed powder for powder metallurgy, the green compact, and the sintered body is now described.

In the method of manufacturing the mixed powder for powder metallurgy, the mixed powder is yielded by mixing the iron-based powder as the principal material powder, an appropriate auxiliary material powder, and the binder of the invention together. An additive such as a lubricant may be contained as necessary.

For example, the binder according to the invention is mixed while being melted, and then solidified. This allows the binder to exist on the surfaces of the principal material powder particles or the auxiliary material powder particles. In addition, the powder particles cohere to one another, which further enhances the suppression effect for component segregation or graphite scattering. For example, the binder is dissolved in a volatile organic solvent such as toluene or acetone, and is dropped or sprayed onto the mixed powder containing the iron-based powder and the auxiliary material powder, and is then mixed together. Subsequently, the organic solvent is volatilized to solidify the binder, so that the mixed powder covered with binder is produced. In another usable process, a powdered binder is directly mixed in the mixed powder containing the iron-based powder and the auxiliary material powder, and the binder is melted by frictional heat caused by inter-particle friction or the like during the mixing so as to cover the mixed powder. Alternatively, the binder is heated to a desired temperature by an external heat source and is thus melted so as to cover the mixed powder. Subsequently, the binder is solidified through cooling or the like. It will be appreciated that the mixed powder may be formed by mixing an iron-based powder, which is beforehand covered with the binder in the same way as above, with an auxiliary material powder being not covered with the binder.

Any of known mixing methods can be used without limitation. For example, such materials are preferably stirred and mixed with a mixing apparatus such as a mixer, a high-speed mixer, a Nauta mixer, a V mixer, or a double-corn blender.

Any of existing mixing conditions may be appropriately used without limitation depending on apparatuses or conditions such as a production scale. In a preferred mixing condition, for example, when a vaned mixer is used, rotational speed of a vane is controlled to a circumferential velocity within a range from 2 to 10 m/s for stirring for about 0.5 to 20 min. When a V mixer or a double conical mixer is used, the materials are preferably mixed at roughly 2 to 50 rpm for 1 to 60 min.

The mixing temperature is, for example, but not limited to, 40 to 60° C. The mixing temperature of 40° C. or higher allows the binder to be less viscous, which improves dispersibility of the binder onto the mixed powder. The upper limit of the mixing temperature is preferably, but not limited to, 60° C. or lower in light of simplicity of a heating apparatus. The materials are mixed together under such a condition, thereby a mixed powder for powder metallurgy, in which the material powders are uniformly mixed, can be produced.

Subsequently, the mixed powder is formed into a green compact by a typical pressing process using a powder compression forming machine. A specific forming condition is not defined because it depends on a type or added amount of each component of the mixed powder, a shape of the green compact, forming temperature of roughly from 20° C. to 150° C., and forming pressure. For example, the mixed powder for powder metallurgy of the invention is filled in a die and pressed under a pressure of 490 to 686 MPa, so that the green compact is produced.

Finally, the green compact is formed into a sintered body by a typical sintering process. Although a specific sintering condition depends on a type or added amount of each component of the green compact and a type of a final product, the green compact is preferably sintered for 5 to 60 min at 1000 to 1300° C. under an atmosphere of $N_2$, $N_2$—$H_2$, or hydrocarbon, for example.

This application claims the benefit of Japanese Priority Patent Application JP 2013-041670 filed on Mar. 4, 2013, the entire contents of which are incorporated herein by reference.

Example

Although the invention is now described in detail with an example, the invention should not be limited thereto, and modifications or alterations thereof may be made within the scope without departing from the gist described before and later, all of which are included in the technical scope of the invention.

The Following Powdered Binders Nos. 1 to 40 were Prepared.

No. 1: Polypropylene ("FLO-THENE" from Sumitomo Seika Chemicals Company Limited)

No. 2: Polyethylene ("FLO-BLEN" from Sumitomo Seika Chemicals Company Limited)

No. 3: Butene-propylene copolymer ("TAFMER XM5080" from Mitsui Chemicals, Inc.)

No. 4: Butene-propylene copolymer ("TAFMER XM5070" from Mitsui Chemicals, Inc.)

No. 5: Butene-ethylene copolymer ("TAFMER DF740" from Mitsui Chemicals, Inc.)

No. 6: Butene-ethylene copolymer ("TAFMER DF640" from Mitsui Chemicals, Inc.)

No. 7: Butene-ethylene copolymer ("TAFMER DF810" from Mitsui Chemicals, Inc.)

No. 8: Butene-ethylene copolymer ("TAFMER DF8200" from Mitsui Chemicals, Inc.)

No. 9: SBR rubber (0.10% SBR-0.6% WXDBS (ethylene bisamide: "WXDBS" from Dai Nippon Chemical Co., Ltd.))

No. 10: SBR rubber (0.10% SBR-0.6% Zn-St)

No. 11: Butyl methacrylate, average molecular weight 150,000 ("M-0603" from Negami chemical industrial co., ltd)

No. 12: Butyl methacrylate, average molecular weight 200,000 ("M-6664" from Negami chemical industrial co., ltd)

No. 13: Butyl methacrylate, average molecular weight 350,000 ("M-6003" from Negami chemical industrial co., ltd)

No. 14: Methyl methacrylate, average molecular weight 1,000,000 ("M-4003" from Negami chemical industrial co., ltd)

No. 15: Ethyl methacrylate, average molecular weight 1,000,000 ("M-5000" from Negami chemical industrial co., ltd)

No. 16: Methyl-ethyl methacrylate, average molecular weight 1,000,000 ("M-4501" from Negami chemical industrial co., ltd)

Nos. 17 to 20: Butene-propylene copolymers in Nos. 3 and 4 and butyl methacrylate in No. 11 were prepared so as to provide addition rates shown in Table 3.

Nos. 21 to 24: Butene-propylene copolymers in Nos. 3 and 4 and butyl methacrylate in No. 12 were prepared so as to provide addition rates shown in Table 3.

Nos. 25 to 28: Butene-propylene copolymers in Nos. 3 and 4 and butyl methacrylate in No. 13 were prepared so as to provide addition rates shown in Table 3.

Nos. 29 to 32: Butene-propylene copolymers in Nos. 3 and 4 and butyl methacrylate in No. 14 were prepared so as to provide addition rates shown in Table 3.

Nos. 33 to 36: Butene-propylene copolymers in Nos. 3 and 4 and butyl methacrylate in No. 15 were prepared so as to provide addition rates shown in Table 3.

Nos. 37 to 40: Butene-propylene copolymers in Nos. 3 and 4 and butyl methacrylate in No. 16 were prepared so as to provide addition rates shown in Table 3.

The melting point and the melt flow rate at 190° C. of each binder were measured by the following method.

[Melting Point of Binder]

Melting peak temperature of each binder was measured in accordance with "Determination of Transition Temperature of Plastics" described in JIS K7121 (2012), and was determined as melting point. Specifically, transition temperature of each plastic was determined using a differential scanning calorimeter ("SSC-5200" from SEIKO Denshi Kogyo Co.) through an operation where a binder resin film strip about 20 mg in weight was enclosed in an aluminum sample pan, and was then heated from 0° C. to 250° C. at an average heating rate 10° C./min under nitrogen atmosphere. A partial region of the resultant calorimetry curve, throughout which the curve is temporarily separated from the base line, was defined as melting peak, and the temperature at the top of the peak was defined as melting point.

[Melt Fluidity (Melt Flow Rate) of Binder Resin]

Adhesion of each resin was measured at a test temperature 190° C. and a load of 2.16 kg in accordance with JIS K7210 (1999) "Annex A Table 1". Such adhesion is listed as "MFR (g/10 min)" (melt flow rate) in Tables.

[Method of Measuring Weight-Average Molecular Weight of Binder]

The weight-average molecular weight of each methacrylic acid polymer was measured using gel permeation chromatography (GPC) in accordance with JIS K7252 (2008).

[Preparation of Mixed Powder for Powder Metallurgy]

A pure iron powder having a particle size of 40 to 120 μm ("ATOMEL 300M" from Kobe Steel, Ltd.) was prepared, and then while 2.0 mass % of copper powder and 0.8 mass % of graphite powder were added to 100 mass % of the pure iron powder and mixed together by a V mixer, a toluene-dissolved binder solution having a binder concentration 2.5 mass % was sprayed onto the mixture and mixed together by stirring such that 0.10 mass % of the binder exists relative to 100 mass % of the pure iron powder, so that a mixed powder for powder metallurgy covered with the binder was yielded.

The fluidity, adhesive property, and segregation characteristics of the resultant mixed powder were determined by the following methods.

[Fluidity]

The fluidity was evaluated through measurement of (1) flow rate based on the melt flow rate, (2) critical outflow diameter, and (3) slit filling level. A mixed powder satisfying all the standards (1) to (3) were evaluated to be good in fluidity. The fluidity is better (1) with a smaller flow rate, (2) with a smaller critical outflow diameter, or (3) with a higher slit filling level.

(1) Flow Rate (s/50 g)

The flow rate was measured in accordance with "Flow Rate Test Method of Metal Powder" described in JIS Z2502 (2012). Specifically, time (s) for 50 g of the mixed powder to flow out through an orifice was measured, and the time (s) was defined as the flow rate of the mixed powder. The flow rate was measured for each of the mixed powders in which resin temperatures were adjusted to 25° C., 50° C., and 70° C. In the invention, a sample satisfying 25 s/50 g or less at each of 25° C., 50° C., and 70° C. was determined to be acceptable. In Table 1, NF (Non-Flow) indicates that the mixed powder did not flow, and a sample marked with NF is unacceptable.

(2) Critical Outflow Diameter (Mm)

Figure 2:
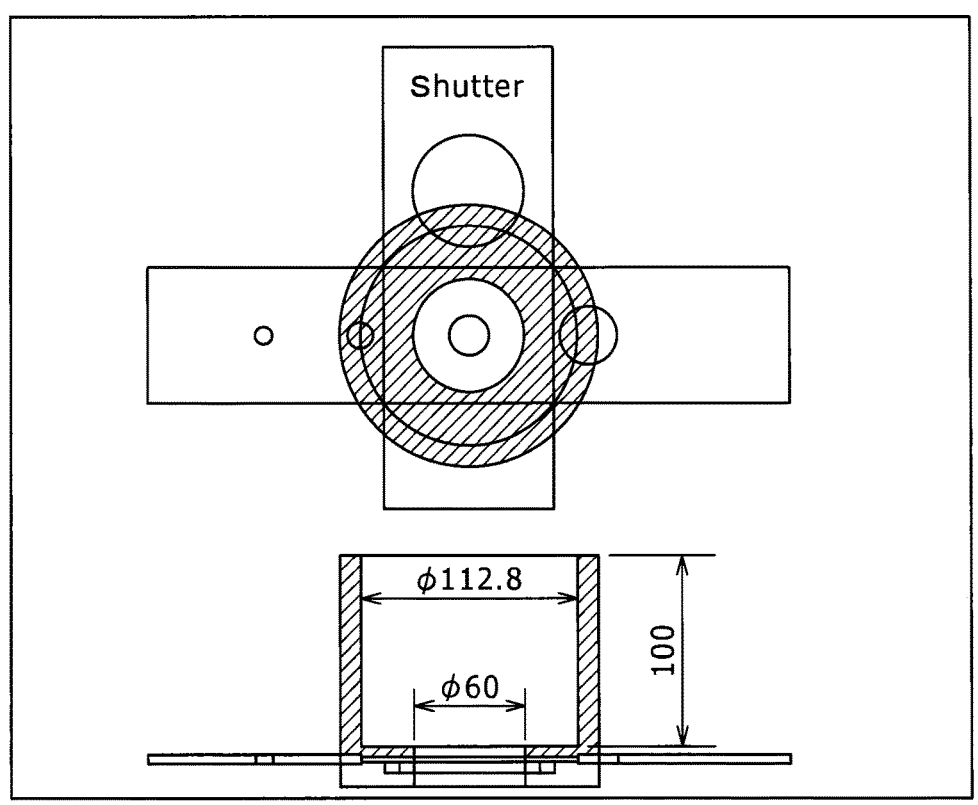
FIG. 2 is a sectional diagram of an instrument for measuring critical outflow diameter used in the example.

The critical outflow diameter was measured using a cylindrical apparatus having an inner diameter 112.8 mm and a height 100 mm as illustrated in FIG. 2. Although FIG. 2 illustrates the apparatus with an opened orifice 60 mm in diameter, a discharge port with a variable diameter is provided at the bottom of the apparatus. While the discharge port was closed, 2 kg of the mixed powder was filled and was held for 10 min. Subsequently, the discharge port was gradually opened, and the minimum dischargeable diameter for the mixed powder was determined and defined as the critical outflow diameter. The smaller the critical outflow diameter, the better the fluidity. In the invention, a sample showing a critical outflow diameter of 25 mm or less was determined to be acceptable, and a sample showing that of 20 mm or less was particularly evaluated to be excellent.

(3) Slit Filling Level (g)

Figures 3A, 3B, 3C, 3D:
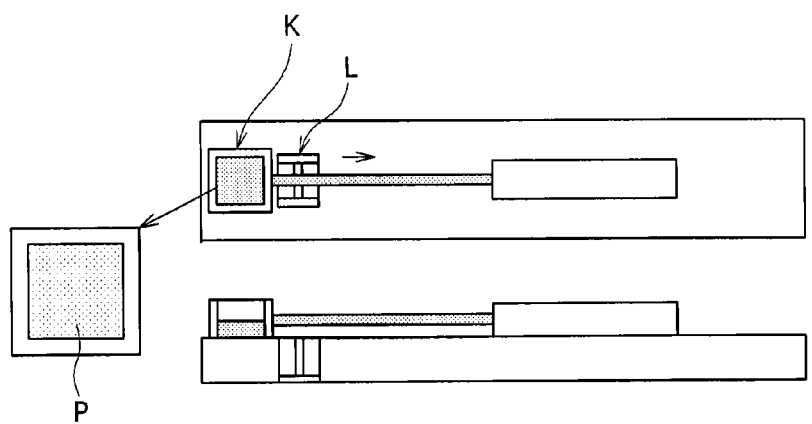
FIGS. 3A to 3D include a top view (FIG. 3A) of an instrument for measuring a slit filling level, the instrument being used in the example, and side views (FIGS. 3B to 3D) illustrating operation of the instrument.

The slit filling level was measured at 25° C. using an apparatus having a slit L 2.5 mm in width as illustrated in FIG. 3A. The mixed powder was filled in a die K 80 mm in width, 80 mm in depth, and 80 mm in height, the bottom of which was entirely opened as illustrated in FIG. 3A, and the die was moved at a shoe speed of 100 mm/s as illustrated in FIGS. 3B to 3D, and then mass of the mixed powder in the slit L vera measured. In the invention, a sample showing a slit filling level of 30 g or more was determined to be acceptable, and a sample showing that of 35 g or more was particularly evaluated to be excellent.

[Adhesive Property]

The graphite scattering rate was measured from C-lose under the condition below, so that the adhesive property of graphite was evaluated. The mixed powder in an amount of 25 g was placed in a funnel-shaped glass tube 2 having an inner diameter 16 mm and a height 106 mm, to which a nuclepore filter 1 having a mesh size of 12 μm was attached, and $N_2$ gas at 25° C. was fed from the lower side of the glass tube 2 at a rate of 0.8 L/min for 20 min, and the graphite scattering rate (%) was obtained from a formula below. In the formula, graphite amount (%) means mass percent of graphite in the mixed powder. In this example, a sample having a graphite scattering rate of 10% or less was determined to be acceptable, and a sample showing that of 0% was particularly evaluated to be excellent. A lower graphite scattering rate means higher adhesion and less dusting.

Graphite scattering rate (%)=[1−(graphite amount (%) in mixed powder after $N_2$ gas flow/graphite amount (%) in mixed powder before $N_2$ gas flow)×100.

The graphite amount in the mixed powder was obtained through quantitative analysis of the carbon content in the mixed powder.

[Segregation Characteristics]

A variation in graphite adhesion amount in the mixed powder was investigated to evaluate the segregation characteristics. Samples were collected at six points of the produced mixed powder. Specifically, three samples were collected at each of the right portion, the laterally central portion, and the left portion of the mixed powder in the regions above and below the thickness center of the mixed powder. Each sample was subjected to measurement of the carbon content in the mixed powder using a carbon analyzer (CSLS600 from LECO Corporation). Evaluation was made as follows: A sample having a variation in carbon content of 30% or more was F (Fail), a sample having that of 20% or more and less than 30% was P (Pass), a sample having that of 10% or more and less than 20% was G (Good), and a sample having that of less than 10% was E (Excellent).

TABLE 1

| | Binder | | | Fluidity | | | | Adhesive property | Segregation characteristics |
|---|---|---|---|---|---|---|---|---|---|
| | | Melting | MFR | (1) Flow rate (s/50 g) | | | (2) Critical outflow diameter | (3) Slit filling level | Graphite scattering rate | Variation in graphite adhesion |
| No. | Material | point (° C.) | (g/10 min) | 25° C. | 50° C. | 70° C. | (mm) | (g) | (%) | amount |
| 1 | Polypropylene | 160 | 10~20 | 26.1 | 23.8 | 24.7 | 22.5 | 27.0 | 42.9 | F |
| 2 | Polyethylene | 120 | 10~20 | 26.4 | NF | NF | 22.5 | 28.9 | 0.0 | F |
| 3 | Butene-propylene copolymer | 85 | 3.0 | 17.8 | 20.9 | 21.1 | 10.0 | 37.3 | 0.0 | P |
| 4 | Butene-propylene copolymer | 77 | 3.0 | 17.6 | 20.9 | 21.5 | 10.0 | 38.4 | 0.0 | P |
| 5 | Butene-ethylene copolymer | 55 | 3.6 | 19.5 | 22.8 | 22.8 | 15.0 | 38.1 | 0.0 | P |
| 6 | Butene-ethylene copolymer | 50 | 3.6 | 19.7 | 22.7 | 22.9 | 15.0 | 38.6 | 0.0 | P |
| 7 | Butene-ethylene copolymer | 66 | 1.2 | 25.2 | NF | NF | 30.0 | 28.2 | 0.0 | P |
| 8 | Butene-ethylene copolymer | 66 | 18 | 26.1 | NF | NF | 25.0 | 29.1 | 0.0 | P |
| 9 | Styrene-butadiene rubber | — | — | 25.5 | 28.4 | NF | 35.0 | 26.3 | 6.7 | E |
| 10 | Styrene-butadiene rubber | — | — | 31.5 | NF | NF | 35.0 | 34.3 | 5.8 | E |

※ NF indicates no flow
※ MFR is an abbreviation of melt flow rate, indicating melt fluidity.

TABLE 2

| | Binder | | Fluidity | | | | | Adhesive property | Segregation characteristics |
|---|---|---|---|---|---|---|---|---|---|
| | | Weight-average | (1) Flow rate (s/50 g) | | | (2) Critical outflow diameter | (3) Slit filling level | Graphite scattering rate | Variation in graphite adhesion |
| No. | Material | molecular weight | 25° C. | 50° C. | 70° C. | (mm) | (g) | rate (%) | amount |
| 11 | Butyl methacrylate | 150,000 | 18.5 | 19.2 | 21.2 | 7.5 | 40 | 0 | E |
| 12 | Butyl methacrylate | 200,000 | 18.5 | 19.4 | 21.8 | 7.5 | 40 | 0 | E |
| 13 | Butyl methacrylate | 350,000 | 18.4 | 19.6 | 21.5 | 7.5 | 40 | 0 | E |
| 14 | Methyl methacrylate | 1,000,000 | 18.3 | 24.2 | 22.8 | 10 | 35 | 0 | G |
| 15 | Ethyl methacrylate | 1,000,000 | 18.8 | 24.1 | 22.4 | 10 | 35 | 0 | G |
| 16 | Methyl-ethyl methacrylate | 1,000,000 | 18.7 | 24.2 | 23.1 | 10 | 35 | 0 | G |

TABLE 3

| | Binder | | | | | Fluidity | | | | | | Segregation characteristics |
|---|---|---|---|---|---|---|---|---|---|---|---|---|
| | | Addition rate | Second binder | Weight-average molecular weight | Addition rate | (1) Flow rate (s/50 g) | | | (2) Critical outflow diameter | (3) Slit filling level | Adhesive property Graphite scattering | Variation in graphite adhesion |
| No. | First binder | | | | | 25° C. | 50° C. | 70° C. | (mm) | (g) | rate (%) | amount |
| 17 | Butene- | 100% | Butyl | 150,000 | 0% | 17.8 | 20.9 | 21.1 | 10 | 37 | 0 | P |
| 18 | propylene | 95% | methacrylate | | 5% | 17.8 | 20 | 21 | 10 | 40 | 0 | G |
| 19 | copolymer | 90% | (M-0603) | | 10% | 18 | 20 | 22 | 10 | 40 | 0 | E |
| 20 | | 0% | | | 100% | 19 | 19 | 21 | 8 | 40 | 0 | E |

TABLE 3-continued

| | Binder | | | | Fluidity | | | (2) Critical outflow diameter (mm) | (3) Slit filling level (g) | Adhesive property Graphite scattering rate (%) | Segregation characteristics Variation in graphite adhesion amount |
|---|---|---|---|---|---|---|---|---|---|---|---|
| | | Addition rate | Second binder | Weight-average molecular weight | Addition rate | (1) Flow rate (s/50 g) | | | | | | |
| No. | First binder | | | | | 25° C. | 50° C. | 70° C. | | | | |
| 21 | Butene- | 100% | Butyl methacrylate (M-6864) | 200,000 | 0% | 17.8 | 20.9 | 21.1 | 10 | 37.3 | 0 | P |
| 22 | propylene | 95% | | | 5% | 19 | 22 | 22.5 | 10 | 38 | 0 | G |
| 23 | copolymer | 90% | | | 10% | 19.6 | 21 | 23.1 | 10 | 39 | 0 | E |
| 24 | | 0% | | | 100% | 18.5 | 19.4 | 21.8 | 7.5 | 40 | 0 | E |
| 25 | Butene- | 100% | Butyl methacrylate (M-6003) | 350,000 | 0% | 17.8 | 20.9 | 21.1 | 10 | 37.3 | 0 | P |
| 26 | propylene | 95% | | | 5% | 19.1 | 22 | 21 | 10 | 39 | 0 | G |
| 27 | copolymer | 90% | | | 10% | 19.8 | 21 | 21.6 | 10 | 38 | 0 | E |
| 28 | | 0% | | | 100% | 18.4 | 19.6 | 21.5 | 7.5 | 40 | 0 | E |
| 29 | Butene- | 100% | Methyl methacrylate (M-4003) | 1,000,000 | 0% | 17.8 | 20.9 | 21.1 | 10 | 37.3 | 0 | P |
| 30 | propylene | 95% | | | 5% | 21 | 21 | 22 | 10 | 36 | 0 | G |
| 31 | copolymer | 90% | | | 10% | 19.8 | 22 | 21.6 | 10 | 35 | 0 | G |
| 32 | | 0% | | | 100% | 18.3 | 24.2 | 22.8 | 10 | 35 | 0 | G |
| 33 | Butene- | 100% | Ethyl methacrylate (M-5000) | 1,000,000 | 0% | 17.8 | 20.9 | 21.1 | 10 | 37.3 | 0 | P |
| 34 | propylene | 95% | | | 5% | 19 | 21 | 22 | 10 | 36 | 0 | G |
| 35 | copolymer | 90% | | | 10% | 19.8 | 22 | 21.6 | 10 | 35 | 0 | G |
| 36 | | 0% | | | 100% | 18.8 | 24.1 | 22.4 | 10 | 35 | 0 | G |
| 37 | Butene- | 100% | Methyl-ethyl methacrylate (M-4501) | 1,000,000 | 0% | 17.8 | 20.9 | 21.1 | 10 | 37.3 | 0 | P |
| 38 | propylene | 95% | | | 5% | 18 | 21 | 21 | 10 | 36 | 0 | G |
| 39 | copolymer | 90% | | | 10% | 19.8 | 23 | 21.6 | 10 | 36 | 0 | G |
| 40 | | 0% | | | 100% | 18.7 | 24.2 | 23.1 | 10 | 35 | 0 | G |

The following considerations are given from Tables 1 and 2.

Nos. 3 to 6 and 11 to 16 each including a binder satisfying the requirements of the invention are good in fluidity under a high temperature, and low in graphite scattering rate, i.e., good in adhesive property. In addition, each of the samples shows a small variation in graphite powder, i.e., good segregation characteristics.

In particular, Nos. 3 and 4 each including the butene-propylene copolymer are better in fluidity at a high temperature than Nos. 5 and 6 each including the butene-ethylene copolymer.

Nos. 11 to 16 each including a methacrylic acid polymer having a weight-average molecular weight of 1,000,000 or less are good in fluidity under a high temperature, and low in graphite scattering rate, i.e., good in adhesive property. The methacrylic acid polymer is sprayed with low viscosity. This provides a small variation in graphite adhesion amount in the mixed powder, i.e., good segregation characteristics. Each of Nos. 11 to 16 including the methacrylic acid polymers exhibits a better segregation suppression effect than each of Nos. 3 to 6 including the butene polymers. Nos. 11 to 13 each having a weight-average molecular weight of 350,000 or less are particularly suppressed in variation in graphite adhesion amount.

Nos. 1, 2, and 7 to 10, which do not satisfy the requirements defined in the invention, each do not exhibit sufficient fluidity, or each have a bad adhesive property.

No. 1 is a sample including polypropylene as a material resin for the binder. This sample is good in critical outflow diameter and in fluidity at a high temperature, but is low in flow rate at 25° C., i.e., bad in fluidity at an ordinary temperature. In addition, since the sample is less adhesive, it is high in graphite scattering rate, i.e., has a bad adhesive property. Furthermore, since the binder is sprayed with high viscosity, the binder cannot be uniformly sprayed onto the mixture including the pure iron powder and the graphite powder, resulting in a variation in graphite adhesion amount.

No. 2 is a sample including polyethylene as a material resin for the binder. This sample simulates PTL 1 described above. This sample is not fluid at a high temperature of 50° C. or higher, i.e., bad in fluidity at the high temperature. Fluidity at 25° C. is also insufficient. Furthermore, as with No. 1, the binder is sprayed with high viscosity, resulting in a variation in graphite adhesion amount.

No. 7 is a sample including a butene-ethylene copolymer, which does not satisfy the requirements of the invention, as a material resin for the binder. In this sample, the melting point of the binder is 66° C., i.e., satisfies the range of the invention, but the melt flow rate (MFR) is low, 1.2 g/10 min. This sample is therefore not fluid, i.e., bad in fluidity under a high temperature of 50° C. or higher. Nos. 5 and 6, which each include a butene-ethylene copolymer satisfying the requirements of the invention, are good in fluidity at a high temperature.

No. 8 is a sample including a butene-ethylene copolymer, which does not satisfy the requirements of the invention, as a material resin for the binder. This sample is high in melt flow rate (MFR), i.e., 18 g/10 min. This sample is therefore excessively highly adhesive and thus not fluid at a high temperature of 50° C. or higher, as with No. 7.

Nos. 9 and 10 are each a sample including a rubber-based material as a start material for the binder. Nos. 9 and 10 are excessively highly adhesive and are not fluid at 70° C. or higher and 50° C. or higher, respectively.

Table 3 reveals that when the dual-component resin including the butene copolymer and the methacrylic acid polymer is used as the binder, such a binder is better in fluidity than the binder including only the butene polymer or the methacrylic acid polymer, and is further suppressed in dust emission or segregation.

For example, when No. 17 including only the butene polymer is compared to No. 18 or 19 including both the butene polymer and the methacrylic acid polymer, while each sample exhibits a good fluidity, Nos. 18 and 19 each show a low variation in graphite adhesion amount in the mixed powder, i.e., each exhibit a good segregation suppression effect. Comparative investigation on Nos. 17 to 20 reveals that if a small amount of the methacrylic acid resin is contained, the segregation suppression effect is improved, and the effect increases with the content of the methacrylic acid polymer.

Nos. 21 to 40 demonstrate the same tendency as that demonstrated by Nos. 17 to 20 while a slight difference in effect exists depending on types of the used methacrylic acid polymer.

LIST OF REFERENCE SIGNS

1 Nuclepore filter
2. Funnel-shaped glass tube
P Mixed powder
K Die
L Slit

The invention claimed is:

1. A binder, comprising:
a butene polymer having a melting point of 50 to 85° C. and a melt fluidity at 190° C. of 2.0 to 3.6 g/10 min, and
optionally a methacrylic acid polymer having a weight-average molecular weight of 1,000,000 or less.

2. The binder of claim 1, comprising the methacrylic acid polymer.

3. The binder of claim 2, comprising the methacrylic acid polymer in an amount of at least 5 mass %.

4. The binder of claim 1, wherein the butene polymer is a copolymer of butene and a lower alkylene.

5. The binder of claim 4, wherein the butene polymer is a butene-propylene copolymer or a butene-ethylene copolymer.

6. A mixed powder, comprising:
an iron-based powder;
an auxiliary material powder; and
the binder of claim 1.

7. The mixed powder of claim 6, wherein a content of the binder is 0.01 to 0.5 mass % relative to a total of 100 mass % of the iron-based powder and the auxiliary material powder.

8. The mixed powder of claim 6, wherein at least some of the iron-based powder and at least some of the auxiliary material powder are covered with the binder.

9. A sintered body, produced by a method comprising: pressing and sintering the mixed powder of claim 6.

* * * * *